(12) United States Patent
Jaradi et al.

(10) Patent No.: US 11,529,923 B2
(45) Date of Patent: Dec. 20, 2022

(54) SEATBACK-MOUNTED OVERHEAD AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/233,923

(22) Filed: Apr. 19, 2021

(65) Prior Publication Data

US 2022/0332268 A1    Oct. 20, 2022

(51) Int. Cl.
| | |
|---|---|
| *B60R 21/207* | (2006.01) |
| *B60R 21/233* | (2006.01) |
| *B60R 21/2338* | (2011.01) |
| *B60R 21/264* | (2006.01) |
| *B60R 21/231* | (2011.01) |
| *B60R 21/00* | (2006.01) |

(52) U.S. Cl.
CPC .......... *B60R 21/207* (2013.01); *B60R 21/233* (2013.01); *B60R 21/2338* (2013.01); *B60R 21/264* (2013.01); *B60R 2021/0053* (2013.01); *B60R 2021/2076* (2013.01); *B60R 2021/23107* (2013.01); *B60R 2021/23153* (2013.01); *B60R 2021/23386* (2013.01)

(58) Field of Classification Search
CPC . B60R 21/207; B60R 21/233; B60R 21/2338; B60R 21/264; B60R 2021/0053; B60R 2021/2076; B60R 2021/23107; B60R 2021/23153; B60R 2021/23386
See application file for complete search history.

(56) References Cited

U.S. PATENT DOCUMENTS

| | | | | |
|---|---|---|---|---|
| 3,218,103 | A | * 11/1965 | Boyce | .................... B64D 25/02 |
| | | | | 128/DIG. 20 |
| 3,753,576 | A | * 8/1973 | Gorman | ................ B60R 21/232 |
| | | | | 297/488 |
| 3,953,049 | A | 4/1976 | Surace et al. | |

(Continued)

FOREIGN PATENT DOCUMENTS

| | | | | |
|---|---|---|---|---|
| DE | 102014004186 A1 | * | 9/2015 | ............. B60R 21/08 |
| FR | 2667831 A1 | | 4/1992 | |

OTHER PUBLICATIONS

Computer generated translation of DE 10 2014 004186 from Espacenet on Jul. 28, 2022 (Year: 2022).*

*Primary Examiner* — Paul N Dickson
*Assistant Examiner* — Tiffany L Webb
(74) *Attorney, Agent, or Firm* — Frank A. MacKenzie; Bejin Bieneman PLC (57) ABSTRACT

An assembly for a vehicle includes a seat having a seat bottom and a seatback supported by the seat bottom. The seat bottom and the seatback define an occupant seating area. The seat includes an airbag supported by an upper end of the seatback. The airbag is inflatable downwardly from the upper end of the seatback enclosing the occupant seating area between the airbag and the seatback. The seat includes a pyrotechnic device fixed to the seat below the airbag. The pyrotechnic device is connected to the airbag.

15 Claims, 5 Drawing Sheets

(56) References Cited

U.S. PATENT DOCUMENTS

| | | | |
|---|---|---|---|
| 4,508,294 A | 4/1985 | Lorch | |
| 6,422,512 B1* | 7/2002 | Lewis | B64D 25/02 244/122 AG |
| 10,471,920 B2* | 11/2019 | Dry | B60R 21/2165 |
| 10,518,733 B2 | 12/2019 | Dry et al. | |
| 10,589,708 B2* | 3/2020 | Cho | B60R 21/0136 |
| 10,625,704 B2 | 4/2020 | Dry et al. | |
| 10,967,826 B2* | 4/2021 | Henriksson | B60R 21/26 |
| 11,027,690 B2* | 6/2021 | Kuepper | B60R 21/23138 |
| 2013/0015642 A1* | 1/2013 | Islam | B60R 21/231 29/428 |
| 2019/0031132 A1* | 1/2019 | Dry | B60R 21/2338 |
| 2020/0307489 A1* | 10/2020 | Line | B60N 2/682 |
| 2021/0009067 A1 | 1/2021 | Kadam et al. | |
| 2021/0009068 A1* | 1/2021 | Farooq | B60R 21/2338 |
| 2021/0061211 A1* | 3/2021 | Jung | B60R 21/26 |

* cited by examiner

SEATBACK-MOUNTED OVERHEAD AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

An assembly for a vehicle includes a seat having a seat bottom and a seatback supported by the seat bottom. The seat bottom and the seatback define an occupant seating area. The seat includes an airbag supported by an upper end of the seatback. The airbag is inflatable downwardly from the upper end of the seatback enclosing the occupant seating area between the airbag and the seatback. The seat includes a pyrotechnic device fixed to the seat below the airbag. The pyrotechnic device is connected to the airbag.

The airbag may include a plurality of inflation chambers spaced from each other along a direction from the upper end of the seatback to a lower end of the airbag when inflated.

The inflation chambers may be tubular and elongated circumferentially about the occupant seating area.

The airbag may include a plurality of uninflatable panels in alternating arrangement with the inflation chambers.

The airbag may include inflatable tubes extending along the uninflatable panels and in fluid communication with the inflation chambers.

The airbag may include inflatable tubes extending between and in fluid communication with the inflation chambers.

The assembly may include a tether retractably connected to the pyrotechnic device and extending from the pyrotechnic device to a lower end of the airbag.

The seatback may include a frame and upholstery, the tether being concealed by the upholstery when the airbag is in an uninflated position.

The upholstery may include a tear seam aligned with the tether.

The pyrotechnic device may be fixed to the seatback.

A vehicle seat includes a seatback defining an occupant seating area. The vehicle seat includes an airbag supported by an upper end of the seatback and inflatable downwardly from the upper end enclosing the occupant seating area between the airbag and the seatback. The airbag includes a plurality of inflation chambers spaced from each other along a direction from the upper end of the seatback to a lower end of the airbag when inflated. The airbag includes a plurality of uninflatable panels in alternating arrangement with the inflation chambers.

The inflation chambers may be tubular and elongated circumferentially about the occupant seating area.

The vehicle seat may include a seat bottom supporting the seatback and defining an occupant leg area, the airbag extending from the upper end of the seatback to the occupant leg area when inflated.

The vehicle seat may include a seat bottom supporting the seatback and defining an occupant leg area, the airbag extending from the upper end of the seatback to the occupant leg area when inflated.

The airbag may include inflatable tubes extending along the uninflatable panels and in fluid communication with the inflation chambers.

With reference to the Figures, wherein like numerals indicate like parts throughout the several views, an assembly 10 for a vehicle 12 includes a seat 14 having a seat bottom 16 and a seatback 18 supported by the seat bottom 16. The seat bottom 16 and the seatback 18 define an occupant seating area 20. The seat 14 includes an airbag 22 supported by an upper end 24 of the seatback 18. The airbag 22 is inflatable downwardly from the upper end 24 of the seatback 18 enclosing the occupant seating area 20 between the airbag 22 and the seatback 18. The seat 14 includes a pyrotechnic device 26 fixed to the seat 14 below the airbag 22. The pyrotechnic device 26 is connected to the airbag 22.

In the event of an impact to the vehicle 12, the airbag 22 surrounding the occupant seating area 20 controls the kinematics of an occupant seated in the seat 14. In some examples, as described further below, the seat 14 may be rotatable to face in various directions. Since the airbag 22 is supported by the seatback 18, the airbag 22 moves with the seatback 18 to control the kinematics of the occupant in any facing position of the seat 14. Since the pyrotechnic device 26 is fixed to the seat 14 below the airbag 22, the pyrotechnic device 26 pulls the airbag 22 downwardly toward the seat bottom 16. This surrounds the occupant seating area 20 between the airbag 22 and the seatback 18. The airbag 22 may enclose the head, neck, chest, and abdomen of the occupant in a fully inflated position. The airbag 22 controls the kinematics of an occupant in the occupant seating area 20. Specifically, the airbag 22 retains the occupant in the occupant seating area 20. The airbag 22 resists movement of the occupant from the occupants seating area and may separate the occupant from other occupants of the vehicle 12.

Figure 1:
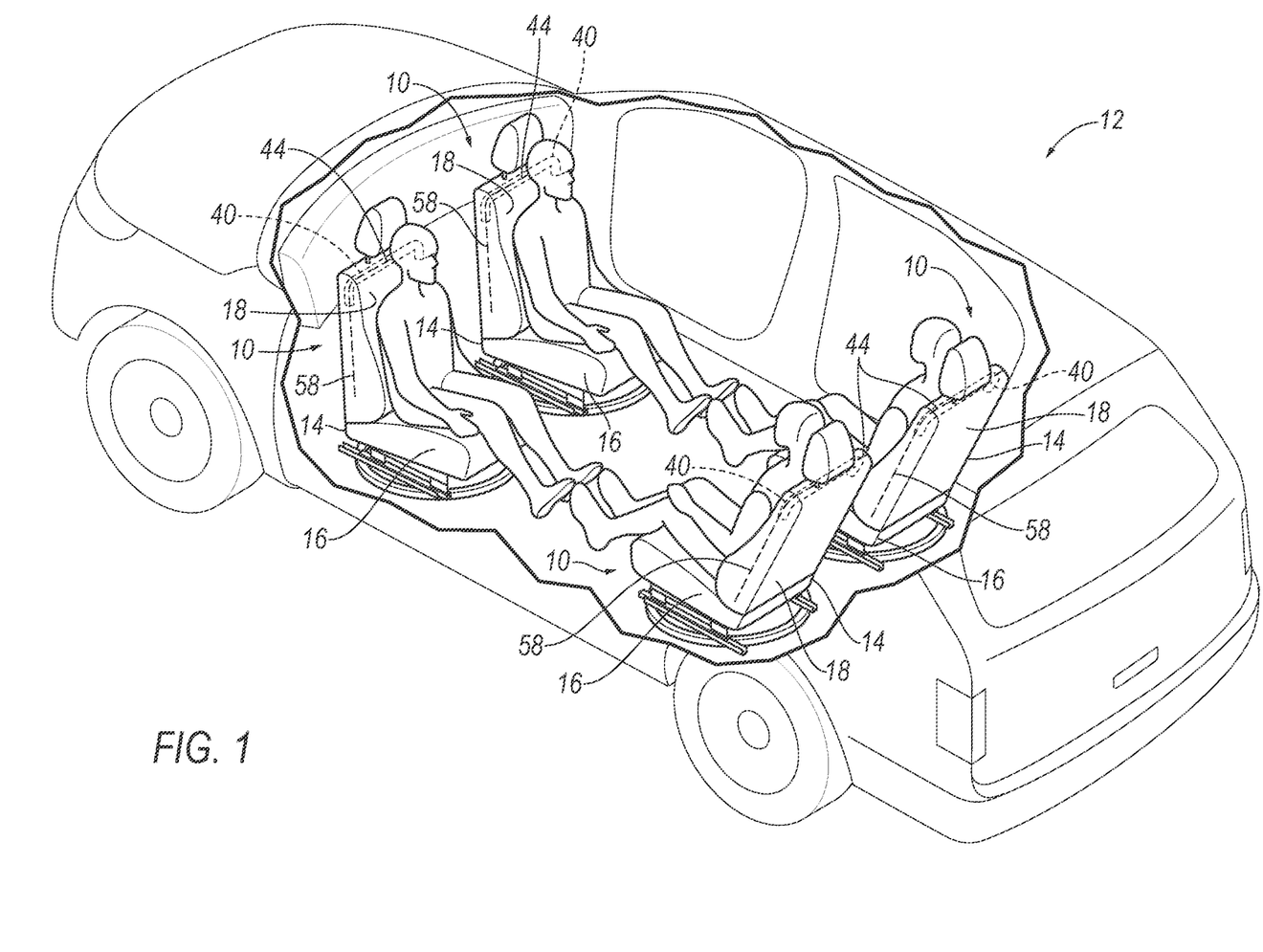
FIG. 1 is perspective view of a vehicle having seats including an airbag at an upper end of a seatback of the seat.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor, vehicle roof, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 may include one or more seats 14. Specifically, the vehicle 12 may include any suitable number of seats 14. The seats 14 are supported by the vehicle floor (not numbered). The seats 14 may be arranged in any suitable arrangement in the passenger compartment. As in the example shown in the Figures, one or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor to various positions, e.g., movable fore-and-aft and/or cross-vehicle 12. The seat 14 may be of any suitable type, e.g., a bucket seat.

The seat 14 includes the seatback 18 and the seat bottom 16. The seatback 18 may be supported by the seat bottom 16. The seatback 18 may extend from the upper end 24 to a lower end 28. The lower end 28 may be connected to the seat bottom 16. The upper end 24 of the seatback 18 may be spaced upwardly from the lower end 28 of the seatback 18, i.e., upwardly from the seat bottom 16.

The seatback 18 and the seat bottom 16 may be stationary or movable relative to the seat bottom 16. The seatback 18 and the seat bottom 16 may be adjustable in multiple degrees of freedom. Specifically, the seatback 18 and the seat bottom 16 may themselves be adjustable. In other words, adjustable components within the seatback 18 and/or the seat bottom 16 may be adjustable relative to each other.

Figure 2A:
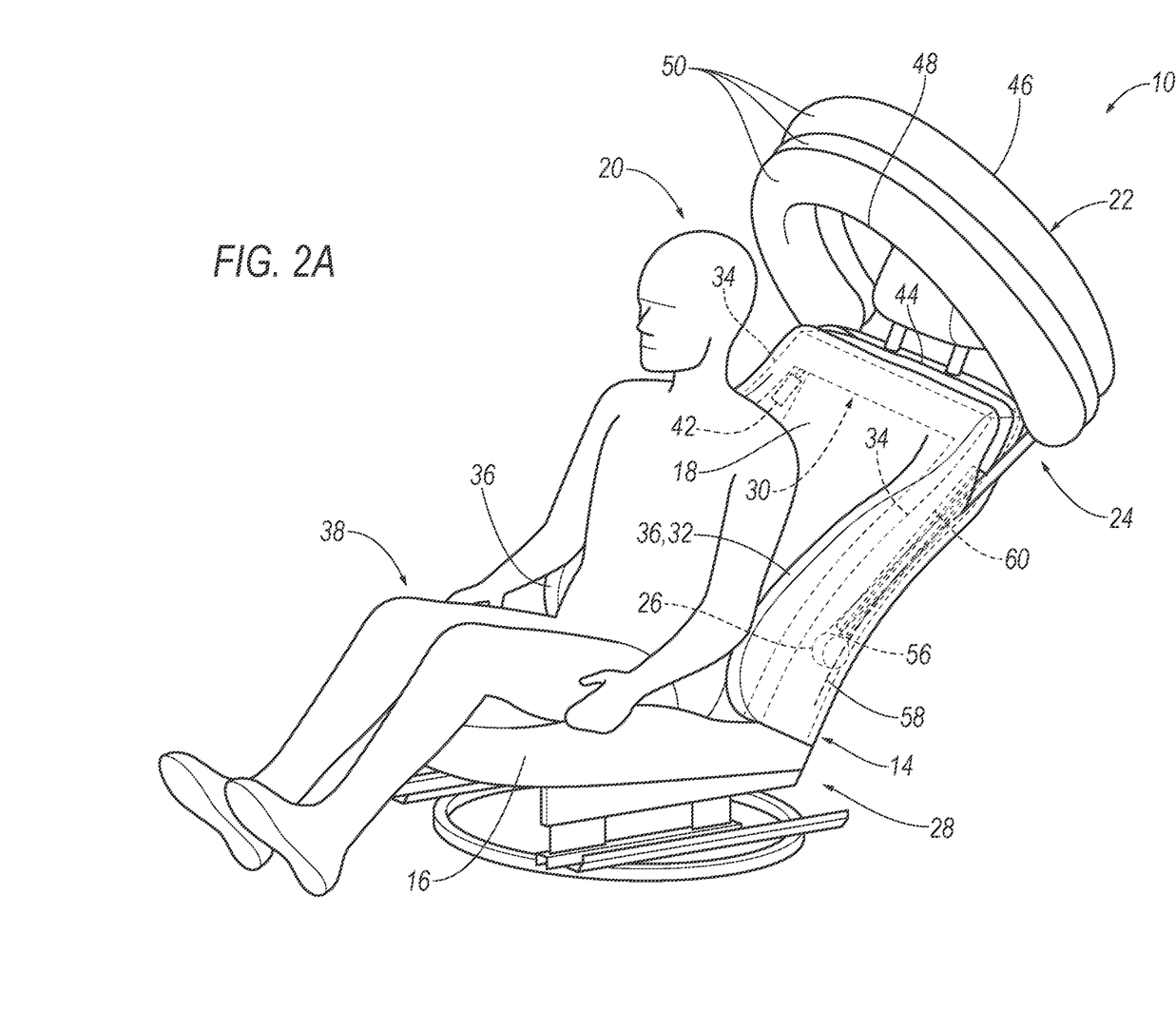
FIG. 2A is a perspective view of the seat having the airbag in an intermediate inflated position.

With reference to FIG. 2A, the seat 14, specifically the seatback 18 and the seat bottom 16, includes a frame 30 and a covering 32 supported on the frame 30. The frame 30 may include tubes, beams, etc. Specifically, the frame 30 includes a pair of upright frame members 34. The upright frame members 34 are elongated, and specifically, are elongated in a generally upright direction when the seatback 18 is in a generally upright position. The upright frame members 34 are spaced from each other and the frame 30 includes one or move cross-members extending between the upright frame members 34. The frame 30, including the upright frame members 34, may be of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The covering 32 may include upholstery, padding, and/or plastic portions. The upholstery may be cloth, leather, faux leather, or any other suitable material. The upholstery may be stitched in panels around the frame 30. The padding may be between the covering 32 and the frame 30 and may be foam or any other suitable material.

Each seat 14 may rotate about an axis (not shown) that extends through the vehicle roof and the vehicle floor. For example, the seats 14 may rotate between a forward-facing position and a rearward-facing position. In the forward-facing position, an occupant of the seat 14 faces the front end of the passenger compartment. In the rearward-facing position, an occupant of the seat 14 faces the rear end of the passenger compartment. The seats 14 may rotate completely, i.e., 360°, about the axis. The seats 14 may rotate between fixed positions, e.g., the forward-facing position and the rearward-facing position, or may be rotatable to an infinite number of positions.

Figure 2B:
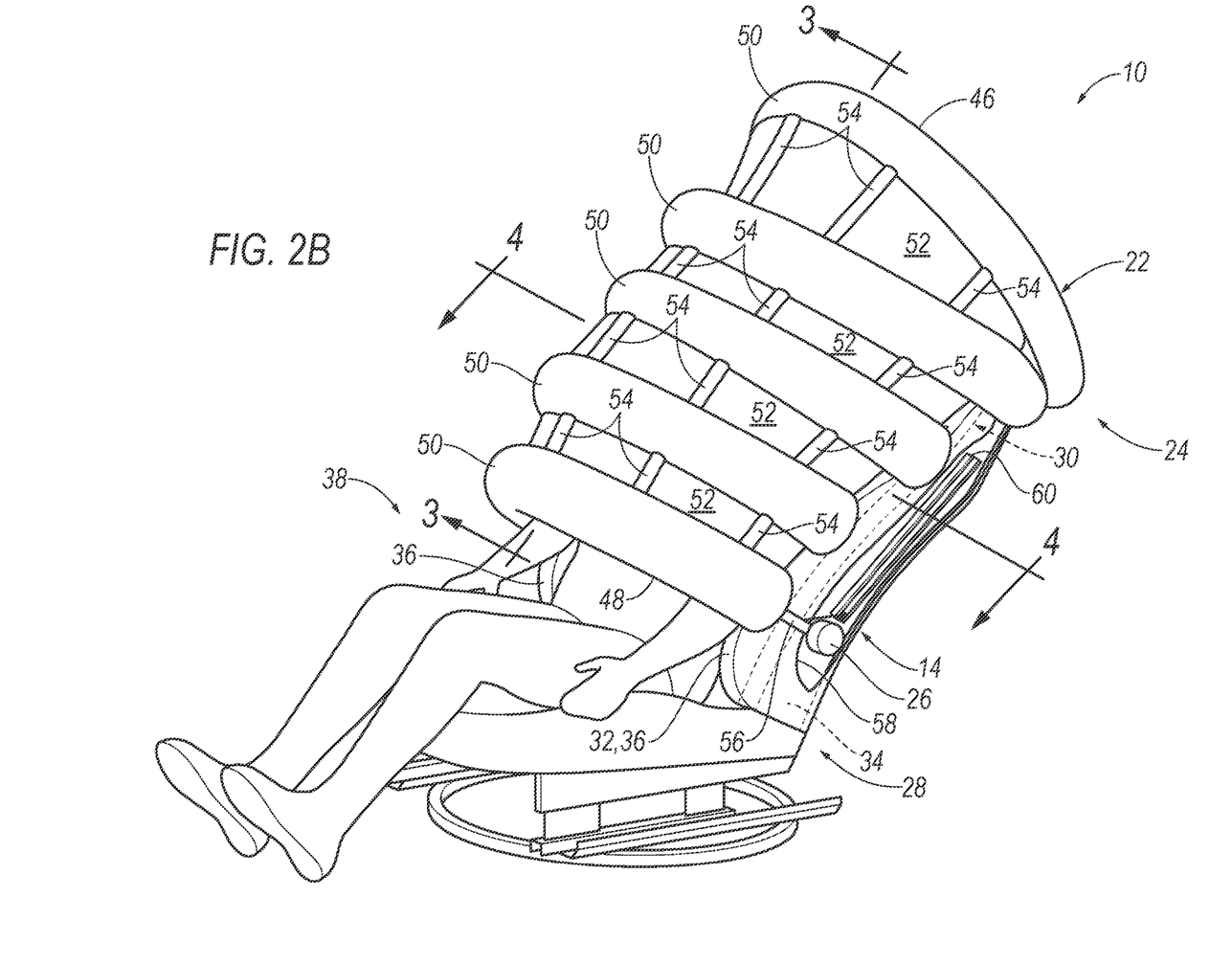
FIG. 2B is a perspective view of the seat having the airbag in a fully inflated position.

With reference to FIGS. 2A and 2B, the seatback 18 and the seat bottom 16 define the occupant seating area 20 of the seat 14, as set forth above. The occupant seating area 20 is the area occupied by an occupant when properly seated on the seat bottom 16 and seatback 18. The occupant seating area 20 is in a seat-forward direction of the seatback 18 and above the seat bottom 16. In the example shown in the Figures, the occupant seating area 20 faces the front end of the passenger compartment when the seat 14 is in the forward-facing position and the occupant seating area 20 faces the rear end of the passenger compartment when the seat 14 is in the rearward-facing position.

The seatback 18 may have bolsters 36 on opposite sides of the occupant seating area 20. The bolsters 36 are elongated, and specifically, are elongated in a generally upright direction when the seatback 18 is in a generally upright position. The bolsters 36 define cross-seat boundaries of the seatback 18, i.e., the seatback 18 terminates at the bolsters 36. The bolsters 36 may extend in a seat-forward direction relative to the occupant seating area 20, i.e., on opposite sides of the torso and shoulders of an occupant seated on the seat 14. The extension of the bolsters 36 relative to the occupant seating area 20 may be defined by the upright frame members 34 and/or the covering 32. In the example shown in the Figures, the size and shape of both the upright frame members 34 and the covering 32 form the bolsters 36.

The seat bottom 16 defines an occupant leg area 38 of the seat 14. The occupant leg area 38 is the area occupied by an occupant's legs when properly seated on the seat bottom 16 and seatback 18. The occupant leg area 38 is in the seat-forward direction of the seatback 18 and along the seat bottom 16. In the example shown in the Figures, the occupant leg area 38 faces the front end of the passenger compartment when the seat 14 is in the forward-facing position and the occupant leg area 38 faces the rear end of the passenger compartment when the seat 14 is in the rearward-facing position.

With reference to FIGS. 1-2B, the seat 14 includes an airbag assembly 40. The airbag assembly 40 includes the airbag 22, an inflator 42, and may include a housing (not shown). The vehicle 12 may include any suitable number of airbag assemblies 40. As one example, each of the seats 14 of the vehicle 12 may include one airbag assembly 40. In examples including more than one airbag assembly 40, the airbag assemblies 40 may be identical or substantially identical to each other.

The airbag assembly 40 is supported by the seatback 18. Specifically, the airbag assembly 40 is supported by the frame 30 of the seat 14 at the upper end 24 of the seatback 18. In an example in which the airbag assembly 40 includes the housing, the housing may be fixed directly the frame 30 of the seat 14, e.g., the frame 30 of the seatback 18. The airbag assembly 40 may be fixed to an upper end 24 of the frame 30 of the seatback 18, e.g., above the frame 30 of the seatback 18. The airbag assembly 40 may be concealed by the covering 32, e.g., the upholstery of the seat 14. In other words, the airbag assembly 40 may be between the frame 30 of the seat 14 and the upholstery of the seat 14.

The inflator 42 is fluidly connected to the airbag 22. The inflator 42 expands the airbag 22 with inflation medium, such as a gas, to inflate the airbag 22. The inflator 42 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 22 moves from an uninflated position to an intermediate inflated position to a fully inflated position as the airbag 22 expands from the inflation medium supplied by the inflator 42. As discussed above, the airbag 22 assembly is supported on the upper end 24 of the seatback 18.

Specifically, the airbag 22 is supported along the upper end 24 of the seatback 18 in the uninflated position. In the uninflated position, the airbag 22 may extend along the frame 30 of the seat 14 at the upper end 24 of the seatback 18. The airbag 22 may be concealed under the covering 32, e.g., the upholstery, of the seat 14. In other words, the airbag 22 may be between the frame 30 of the seat 14 and the upholstery of the seat 14 in the uninflated position.

As shown in FIG. 2A, the airbag 22 moves from the uninflated position to the intermediate inflated position. Specifically, the airbag 22 begins to fully inflate above the occupant seated in the occupant seating area 20 to the intermediate inflated position. In the intermediate inflated position, the airbag 22 may be spaced upwardly from the head of the occupant in the seat 14. In the event of an impact to the vehicle 12, the airbag 22 breaks through the covering 32 of the seat 14 to move to the intermediate position. For example, the covering 32 of the seat 14 may include a tear seam 44 extending along the upper end 24 of the seatback 18. As the airbag 22 moves from the uninflated position to the intermediate inflated position, the tear seam 44 is release to allow the airbag 22 to begin to inflate.

As shown in FIG. 2B, after inflating to the intermediate inflated position, the airbag 22 moves to the fully inflated position. In the fully inflated position, the airbag 22 may extend from an upper end 46 to a lower end 48 along the seatback 18. Specifically, in the fully inflated position, the airbag 22 extends from the upper end 24 of the seatback 18 toward the lower end 28 of the seatback 18. In other words, the airbag 22 may extend from the upper end 24 of the seatback 18 to the occupant leg area 38 when inflated. The upper end 46 of the airbag 22 may be vertically aligned with and connected to the upper end 24 of the seatback 18 and the lower end 48 of the airbag 22 may be vertically aligned with the occupant leg area 38.

As the airbag 22 moves away from the intermediate inflated position to the fully inflated position, the lower end 48 of the airbag 22 moves toward the lower end 28 of the seatback 18 and the occupant leg area 38. In other words, the lower end 48 of the airbag 22 moves relative to the seatback 18 of the seat 14. The lower end 48 of the airbag 22 moves downwardly relative to the seatback 18 and away from the upper end 46 of the airbag 22 and the upper end 24 of the seatback 18. The upper end 46 of the airbag 22 remains fixed relative to the upper end 24 of the seatback 18 as the lower end 48 of the airbag 22 moves downwardly.

The airbag 22 includes a plurality of inflation chambers 50. The inflation chambers 50 are spaced from each other along a direction from the upper end 24 of the seatback 18 to the lower end 48 of the airbag 22 when inflated, i.e., when the airbag 22 is in the fully inflated position. Specifically, the airbag 22 may include an inflation chamber 50 at the upper end 46 of the airbag 22, an inflation chamber 50 at the lower end 48 of the airbag 22, and a plurality of inflation chambers 50 between the upper end 46 of the airbag 22 and the lower end 48 of the airbag 22. In the example shown in FIGS. 2B and 3, the airbag 22 includes five inflation chambers 50 spaced along the direction from the upper end 24 of the seatback 18 to the lower end 48 of the airbag 22, i.e., the airbag 22 includes one inflation chamber 50 at the upper end 46 of the airbag 22, one inflation chamber 50 at the lower end 48 of the airbag 22 and three inflation chambers 50 between the upper end 46 and the lower end 48 of the airbag 22. The airbag 22 may include any suitable number of inflation chambers 50 to surround the occupant seating area 20 when the airbag 22 is in the in the fully inflated position.

Figure 3:
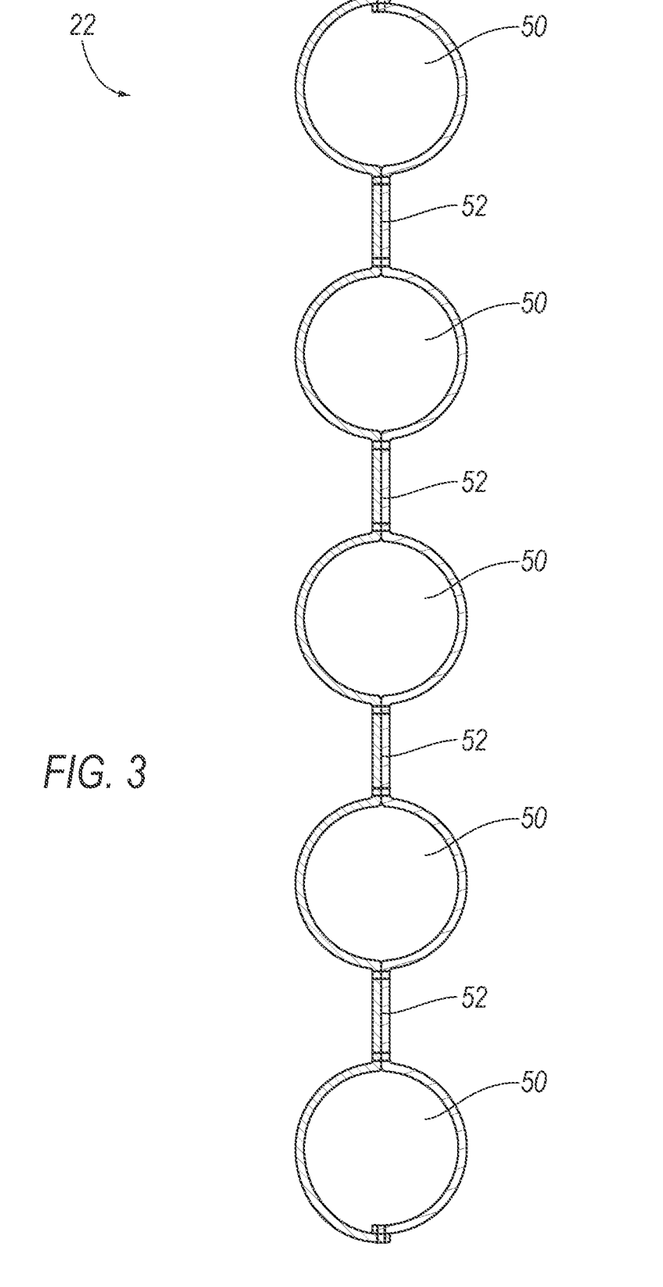
FIG. 3 is a cross-sectional view through the airbag at line 3 shown in FIG. 2B.

As the airbag 22 moves from the uninflated position to the intermediate inflated position, the inflation chamber 50 at the upper end 46 of the airbag 22 and the inflation chamber 50 at the lower end 48 of the airbag 22 both inflate with inflation medium. The plurality of inflation chambers 50 between the upper end 46 and the lower end 48 of the airbag 22 begin to inflate with inflation medium. The lower end 48 of the airbag 22 moves downwardly relative to the seatback 18 of the seat 14 toward the lower end 28 of the seatback 18 and the occupant leg area 38. The plurality of inflation chambers 50 between the upper end 46 of the airbag 22 and the lower end 48 of the airbag 22 inflate. After all inflation chambers 50 have inflated, the airbag 22 is in the fully inflated position.

The inflation chambers 50 may be tubular and are elongated circumferentially about the occupant seating area 20 in the fully inflated position. The airbag 22 encloses the occupant seating area 20 between the airbag 22 and the seatback 18 in the fully inflated position. Specifically, the inflation chambers 50 each surround the occupant seating area 20 when the airbag 22 is in the fully inflated position. The airbag 22 may surround an occupant seated in the occupant seating area 20 when the airbag 22 is in the fully inflated position. Accordingly, the airbag 22 controls the kinematics of the occupant seated in the seat 14 and may separate the occupant of the seat 14 from other vehicle occupants in the vehicle 12 in the event of the impact.

The inflation chambers 50 extend around the occupant seating area 20 from one bolster 36 to the other bolster 36. Specifically, the inflation chambers 50 may be elongated in a round path from one bolster 36 to the other bolster 36. The inflation chambers 50 may be elongated in a partial-circle path from one bolster 36 to the other bolster 36. The inflation chambers 50 may be round in cross-section perpendicular to an axis of elongation. Specifically, the inflation chambers 50 may be circular in cross-section.

The airbag 22 includes a plurality of uninflatable panels 52 between the inflation chambers 50 along the direction from the upper end 24 of the seatback 18 and the lower end 48 of the airbag 22. Specifically, the uninflatable panels 52 are in alternating arrangement with the inflation chambers 50. The inflation chambers 50 are spaced from each other along the direction from the upper end 24 of the seatback 18 to the lower end 48 of the airbag 22 by the uninflatable panels 52. The uninflatable panel 52 is not in fluid communication with the inflation chambers 50 and is not inflated when the inflation chambers 50 are inflated. In other words, the uninflatable panel 52 is separated from any inflation chambers 50 of the airbag 22. The uninflatable panel 52 does not include a chamber inflatable by inflation medium. The uninflatable panels 52 do not fill with inflation medium as the inflation chambers 50 inflate with inflation medium.

Figure 4:
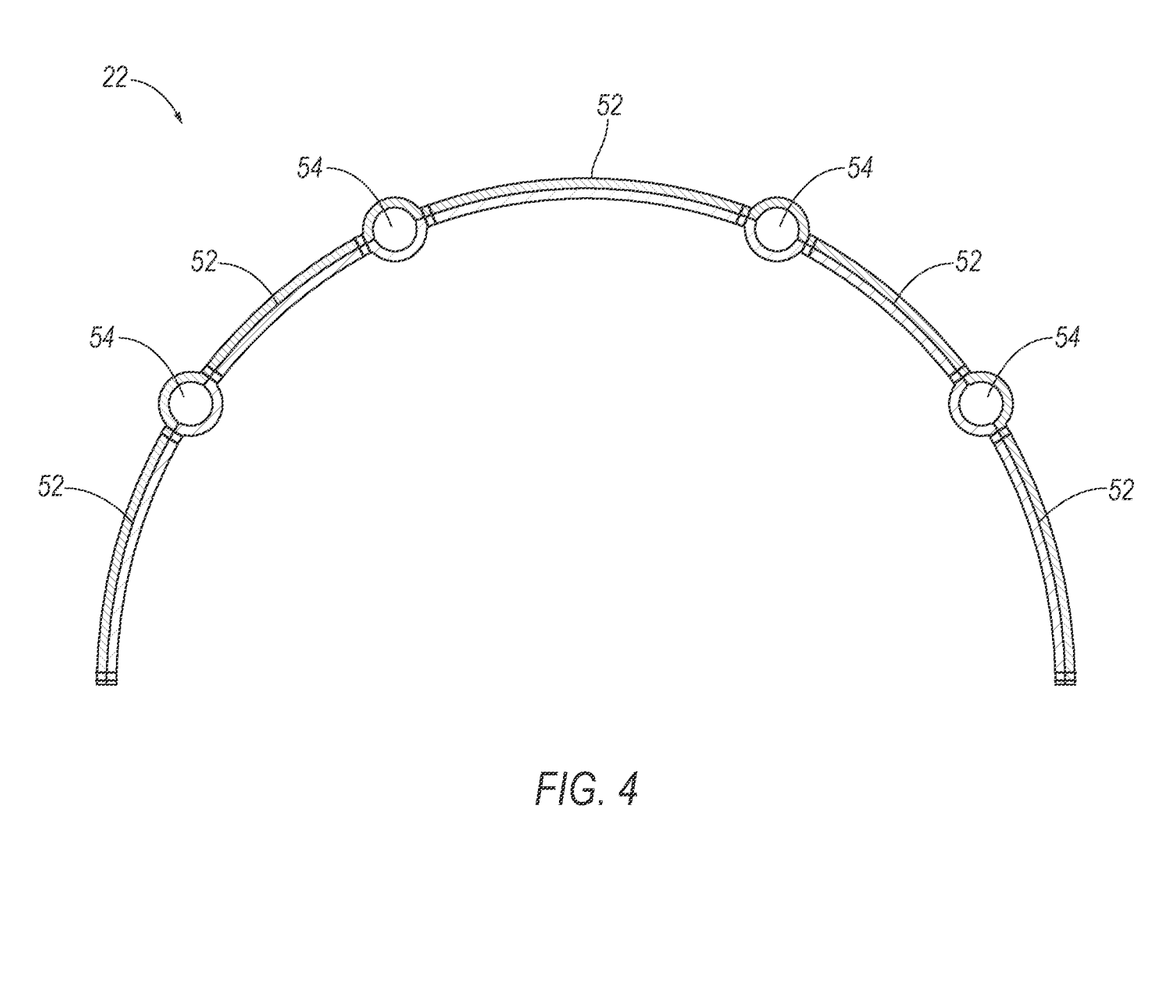
FIG. 4 is a cross-sectional view through the airbag at line 4 shown in FIG. 2B.

The airbag 22 includes inflatable tubes 54 extending along the uninflatable panels 52. The inflatable tubes 54 extend between the inflation chambers 50 and are in fluid communication with the inflation chambers 50. The inflatable tubes 54 allow inflation medium to pass the inflation chambers 50 as the airbag 22 moves to the fully inflated position. Specifically, the inflatable tubes 54 extend between and in fluid communication with the inflation chambers 50. Inflation medium from the inflator 42 may pass between the inflation chambers 50 through the inflatable tubes 54. In the example shown in FIGS. 2B and 4, the airbag 22 includes uninflatable panels 52 extending along each of the uninflatable panels 52 between the five inflation chambers 50. Specifically, as shown in FIGS. 2B and 4, the airbag 22 includes four inflatable tubes 54 extending along each of the uninflatable panels 52. The inflatable tubes 54 extend between each of the inflation chambers 50 to fluidly connect the inflation chambers 50 and allow inflation medium to move between the inflation chambers 50. The inflatable tubes 54 may be elongated from one inflation chamber 50 to another inflation chamber. The inflatable tubes 54 may be elongated generally vertically.

The airbag 22, i.e., the inflation chambers 50, the inflatable tubes 54, and the uninflatable panels 52, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

As shown in FIGS. 2A and 2B, the pyrotechnic device 26 is fixed to the seat 14 below the airbag 22. Specifically, as shown in the example in the Figures, the pyrotechnic device 26 may be fixed to the seatback 18 of the seat 14 below the airbag 22. In other examples, the pyrotechnic device 26 may be fixed at any suitable location on the seat 14 and below the airbag 22, e.g., the seat bottom 16.

The pyrotechnic device 26 is connected to the airbag 22. Specifically, the pyrotechnic device 26 may be connected to the lower end 48 of the airbag 22. In the event of an impact to the vehicle 12, the pyrotechnic device 26 moves the airbag 22 from the intermediate inflated position to the fully inflated position. The pyrotechnic device 26 pulls the lower end 48 of the airbag 22 along the seatback 18 toward the lower end 28 of the seatback 18 and the occupant leg area 38. In other words, the lower end 48 of the airbag 22 is movable relative to the seatback 18 by the pyrotechnic device 26. As the pyrotechnic device 26 moves the lower end 48 of the airbag 22 downwardly relative to the seatback 18, the inflation chambers 50 between the inflation chamber 50 at the upper end 46 of the airbag 22 and the inflation chamber 50 at the lower end 48 of the airbag 22 may inflate to the fully inflated position. Inflation medium may pass by the inflatable tubes 54 between the inflation chambers 50 as the lower end 48 of the airbag 22 is moved by the pyrotechnic device 26 to the fully inflated position.

The seat 14 may include a tether 56 extending from the pyrotechnic device 26 to the airbag 22. Specifically, the tether 56 extends from the pyrotechnic device 26 to the lower end 48 of the airbag 22. The tether 56 may be retractably connected to the pyrotechnic device 26. In the event of an impact to the vehicle 12, the pyrotechnic device 26 may retract the tether 56 along the seatback 18 to move the lower end 48 of the airbag 22 toward the lower end 28 of the seatback 18 and the occupant leg area 38.

The tether 56 may be concealed by the upholstery of the seatback 18 when the airbag 22 is in an uninflated position. The upholstery may be releasable along the tether 56 and adjacent the pyrotechnic device 26. Specifically, the upholstery may include a tear seam 58 aligned with the tether 56. The tether 56 and the tear seam 58 are positioned such that the tether 56 breaks through the tear seam 58 as the pyrotechnic device 26 retracts the tether 56.

The seat 14 may include a guide 60 supported by the frame 30 of the seat 14. As shown in the Figures, the guide 60 may be elongated along the upright frame members 34 of the frame 30. The tether 56 may be slidably coupled to the guide 60. Specifically, the tether 56 is able to slide along the guide 60 relative to the frame 30 as the airbag 22 moves from the intermediate inflated position to the inflated position. As the pyrotechnic device 26 retracts the tether 56, the tether 56 slides along the guide 60 and moves the airbag 22 to the inflated position. The guide 60 controls movement of the tether 56 along the frame 30 as the tether 56 moves relative to the frame 30 of the seat 14. The guide 60 may be aligned with the tear seam 58 along the side of the seat 14. The seat 14 may include any suitable number of guides 60, i.e., the seat 14 may include a guide 60 along each side of the seat 14 and aligned the tear seam 58 along each side of the seat 14.

The seat 14 may include any number of pyrotechnic devices 26 suitable to move the lower end 48 of the airbag 22 toward the lower end 28 of the seatback 18 and the occupant leg area 38. For example, the seat 14 may include two pyrotechnic devices 26, e.g., one pyrotechnic device 26 on each side of the seat 14 connected to the lower end 48 of the airbag 22, i.e., on each side of the airbag 22. In the event of an impact to the vehicle 12, each of the pyrotechnic devices 26 may be activated and move the lower end 48 of the airbag 22 toward the lower end 28 of the seatback 18 and occupant leg area 38.

The pyrotechnic device 26 includes a pyrotechnic charge that activates the pyrotechnic device 26 to move the airbag 22 downwardly from the upper end 24 of the seatback 18 to the fully inflated position. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The pyrotechnic device 26 may be any suitable type such as a rotary actuator, in which the pyrotechnic charge rotates a shaft connected to the tether 56 such that the tether 56 wraps around the shaft; a piston linkage, in which the pyrotechnic charge for example, drives a piston attached to the tether 56; a ball-in-tube linkage, in which an pyrotechnic charge propels a ball or balls over a cogwheel connected to the tether 56; a mechanical linkage, in which a compressed spring attached to the tether 56 is released; or any other suitable type.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
    a seat including a seat bottom and a seatback supported by the seat bottom and defining an occupant seating area;
    an airbag supported by an upper end of the seatback and inflatable downwardly from the upper end enclosing the occupant seating area between the airbag and the seatback;
    a pyrotechnic device fixed to the seatback below the airbag and connected to the airbag and;
    a tether retractably connected to the pyrotechnic device and extending from the pyrotechnic device to a lower end of the airbag.

2. The assembly of claim 1, wherein the airbag includes a plurality of inflation chambers spaced from each other along a direction from the upper end of the seatback to a lower end of the airbag when inflated.

3. The assembly of claim 2, wherein the inflation chambers are tubular and elongated circumferentially about the occupant seating area.

4. The assembly of claim 2, wherein the airbag includes a plurality of uninflatable panels in alternating arrangement with the inflation chambers.

5. The assembly of claim 4, wherein the airbag includes inflatable tubes extending along the uninflatable panels and in fluid communication with the inflation chambers.

6. The assembly of claim 2, wherein the airbag includes inflatable tubes extending between and in fluid communication with the inflation chambers.

7. The assembly of claim 1, wherein the seatback includes a frame and upholstery, the tether being concealed by the upholstery when the airbag is in an uninflated position.

8. The assembly of claim 7, wherein the upholstery includes a tear seam aligned with the tether.

9. The assembly of claim 8, wherein the seat includes a guide supported by the frame and aligned with the tear seam, the tether being slidably coupled to the guide.

10. The assembly of claim 1, wherein the seatback includes a frame, and further comprising a guide supported by the frame of the seatback frame of the seatback, the tether being slidably coupled to the guide.

11. The assembly of claim 10, wherein the guide is elongated in a direction from an upper end to a lower end of the seatback.

12. A vehicle seat comprising:
a seatback defining an occupant seating area;
an airbag supported by an upper end of the seatback and inflatable downwardly from the upper end enclosing the occupant seating area between the airbag and the seatback;
the airbag including a plurality of inflation chambers spaced from each other along a direction from the upper end of the seatback to a lower end of the airbag when inflated; and
the airbag including a plurality of uninflatable panels in alternating arrangement with the inflation chambers and;
the airbag includes inflatable tubes extending along the uninflatable panels and in fluid communication with the inflation chambers.

13. The vehicle seat of claim 12, wherein the inflation chambers are tubular and elongated circumferentially about the occupant seating area.

14. The vehicle seat of claim 13, further comprising a seat bottom supporting the seatback and defining an occupant leg area, the airbag extending from the upper end of the seatback to the occupant leg area when inflated.

15. The vehicle seat of claim 12, further comprising a seat bottom supporting the seatback and defining an occupant leg area, the airbag extending from the upper end of the seatback to the occupant leg area when inflated.

* * * * *

UNITED STATES PATENT AND TRADEMARK OFFICE
CERTIFICATE OF CORRECTION

PATENT NO. : 11,529,923 B2
APPLICATION NO. : 17/233923
DATED : December 20, 2022
INVENTOR(S) : Dean M. Jaradi It is certified that error appears in the above-identified patent and that said Letters Patent is hereby corrected as shown below:

In the Claims

Column 9, Line 23, Claim 10: delete ", the tether being slidably coupled to the guide".

Signed and Sealed this
Fourth Day of April, 2023

Katherine Kelly Vidal
*Director of the United States Patent and Trademark Office*